(12) United States Patent
Bockbrader (10) Patent No.: US 7,861,646 B2
(45) Date of Patent: Jan. 4, 2011

(54) DEVICE FOR PRODUCING SMALL BATCHES OF COFFEE FROM LIQUID COFFEE CONCENTRATE

(76) Inventor: Robert H. Bockbrader, 268 Hunter Pkwy., Cuyahoga Falls, OH (US) 44223

( * ) Notice: Subject to any disclaimer, the term of this patent is extended or adjusted under 35 U.S.C. 154(b) by 572 days.

(21) Appl. No.: 12/004,551

(22) Filed: Dec. 21, 2007

(65) Prior Publication Data

US 2008/0148959 A1    Jun. 26, 2008

Related U.S. Application Data

(60) Provisional application No. 60/876,960, filed on Dec. 22, 2006.

(51) Int. Cl.
*A23F 5/00* (2006.01)
*B67D 7/80* (2010.01)

(52) U.S. Cl. .......................... 99/323.3; 99/275; 99/279; 99/292; 99/297; 99/300; 99/302 R; 222/146.1; 222/146.2; 222/146.6

(58) Field of Classification Search ................ 99/323.3, 99/275, 279, 292, 297, 300, 302 R; 222/146.1; 222/146.2, 146.6
See application file for complete search history.

(56) References Cited

U.S. PATENT DOCUMENTS

| | | | |
|---|---|---|---|
| 2,682,984 A | 7/1954 | Melikian et al. | |
| 3,641,918 A | 2/1972 | Schellgell et al. | |
| 4,470,999 A | 9/1984 | Carpiac | |
| 5,740,719 A | 4/1998 | Triola et al. | |
| 6,073,539 A | 6/2000 | Triola et al. | |
| 7,028,603 B1 | 4/2006 | Gremillion et al. | |
| 2006/0000851 A1 | 1/2006 | Girard et al. | |
| 2006/0169148 A1 | 8/2006 | Shultis | |

OTHER PUBLICATIONS

"KARMA Coffee-Captain Liquid Coffee Dispensers Models 670 & 672", 2 pgs., Publisher believed to be Karma, P.O. Box 433, Watertown, WI 53094, date and place of publication unknown.

*Primary Examiner*—Shawntina Fuqua (57) ABSTRACT

A device for brewing batches, such as, but not limited to, relatively small one or two cup batches, of coffee from water and liquid coffee concentrate, preferably shelf stable. The size of the device, preferably similar to an automatic drip coffee maker, allows the device to be conveniently utilized in the home, an office, a hotel suite, or hospitality area or the like. The device includes a metered volumetric mix valve assembly that, when activated, admits simultaneously or sequentially a finite volume of water and liquid concentrate to a mixing chamber or conduit where they are mixed and then dispensed to a container such as a carafe, cup, mug or the like. Mixing can take place in one or more of the mixing chamber or conduit and the container in which the water and concentrate are dispensed. In this manner, repeatable beverage solutions are obtained. Advantageously, the device is constructed so that the liquid concentrate flows gravimetrically to the volumetric mix valve assembly, and a costly concentrate pump is not necessary. The device can be sealed so that theft of the coffee concentrate can be prevented.

20 Claims, 5 Drawing Sheets

DEVICE FOR PRODUCING SMALL BATCHES OF COFFEE FROM LIQUID COFFEE CONCENTRATE

CROSS REFERENCE

This application claims the priority filing date of U.S. Provisional Application Ser. No. 60/876,960 filed Dec. 22, 2006, herein fully incorporated by reference.

FIELD OF THE INVENTION

The present invention relates to a device for brewing batches, such as, but not limited to, relatively small one or two cup batches, of coffee from water and liquid coffee concentrate, preferably shelf stable. The size of the device, preferably similar to an automatic drip coffee maker, allows the device to be conveniently utilized in the home, an office, a hotel suite, or hospitality area, or the like. The device includes a metered volumetric mix valve assembly that, when activated, admits simultaneously or sequentially a finite volume of water and liquid concentrate to a mixing chamber or conduit where they are dispensed to a container such as a carafe, cup, mug or the like. Mixing can take place in one or more of the mixing chamber or conduit and the container into which the water and concentrate are dispensed. In this manner, repeatable beverage solutions are obtained. Advantageously, the device is constructed so that the liquid concentrate flows gravimetrically to the volumetric mix valve assembly, and a costly concentrate pump is not necessary. The device can be sealed so that theft of the coffee concentrate can be prevented.

BACKGROUND OF THE INVENTION

Numerous different devices have been proposed for brewing coffee, whether from ground coffee beans or liquid coffee concentrates. A problem exists in that it would be desirable to provide an inexpensive, compact device that is easy to operate, and maintain, and can be used in an environment such as home, office or hotel suite.

U.S. Pat. No. 2,682,984 relates to coffee vending machines and more particularly, to machines for vending coffee responsive to actuation of a coin control mechanism; wherein all the ingredients such as coffee, cream, sugar, etc., are interdependently controlled.

U.S. Pat. No. 3,641,918 relates to a coffee dispensing apparatus including a refrigerating chamber for a liquid coffee concentrate; a water heater having a float controlled solenoid for maintaining a predetermined level of water within said water heater; a coffee concentrate dispensing line extending through said water heater to a mixing bowl, a pump for pumping concentrate to the mixing bowl, a hot waterline from the water heater to the mixing bowl and a solenoid valve to control the discharge of hot water from said water heater. An electrical circuit including a pair of timing cams is provided for sequentially discharging a predetermined amount of coffee concentrate and hot water into the mixing bowl to produce a single cup of coffee at a time.

U.S. Pat. No. 4,470,999 relates to an apparatus and method for high speed, high volume making of coffee by preheating then superheating water, mixing with a liquid coffee concentrate and reportedly balancing heat demands throughout the apparatus to enable preheating of the receiving urn, storing of heat as steam beyond the boiler, and return of that steam to the boiler responsive to pressure drop caused by differential flow rates into and from the boiler, to reportedly enable rapid recovery of the boiler and rapid making of large quantities of coffee.

U.S. Pat. No. 5,740,719 relates to a coffee machine for use with shelf-stable liquid coffee concentrate which includes a built-in storage reservoir that doubles as a hydraulic cylinder to deliver the requisite amount of shelf-stable liquid coffee concentrate into the brewing chamber. The machine allows heated water to mix with the concentrate in both the brewing chamber and the mixing chamber and then collect in a carafe.

U.S. Pat. No. 6,073,539 relates to a bottled water dispenser capable of producing and delivering a desired amount of coffee produced by mixing liquid coffee concentrate and bottled water. The device includes a pump for delivering coffee concentrate from a storage reservoir received within the dispenser housing to a mixing chamber. The dispenser further includes a hot water system in selective communication with the mixing chamber using a solenoid. The solenoid and pump are activated with a pair of buttons on the housing exterior. A child safety switch is electrically connected to the buttons which, when activated, requires that both buttons be simultaneously depressed to activate the pump and solenoid. When the switch is disabled, only one button must be depressed. Accordingly, a user may dispense a desired amount of coffee produced from bottled water by pressing a button.

U.S. Pat. No. 7,028,603 relates to a combination water and coffee dispenser which includes a hollow housing having an interior chamber. A water supply line extends from a domestic water source into the interior chamber for supplying fresh water to a cold water storage tank, a hot water storage tank and possibly to a raw water dispensing nozzle on the exterior of the housing. A liquid coffee concentrate storage container is received within the interior chamber and is in liquid communication with a pump. A discharge tube extends from the pump to a mixing chamber. Hot water is routed from the hot water storage tank to the mixing chamber wherein the hot water is mixed with liquid coffee concentrate to produce coffee having a predetermined concentration. The pump speed and thus the concentration of coffee produced in the mixing chamber is controlled by a potentiometer. The device is also equipped with a chilled compartment for storing refrigerated liquid coffee concentrate formulations.

U.S. Patent Application Publication No. 2006/0169148 relates to an apparatus for producing a beverage from concentrate. A mixing chamber is included. A water tank and a concentrate container provide water and concentrate. A water conduit is horizontally oriented and is connected to the water tank to supply water from the water tank to the mixing chamber by gravity. A concentrate conduit extends from the concentrate container and at an acute angle to the water conduit and then extends generally parallel to the water conduit and in close proximity to the water conduit. The mixing chamber is connected to both the water conduit and the concentrate conduit. Both the concentrate conduit and the water conduit have an outlet end. Each outlet end is remote from the water tank and the concentrate container. The outlet end of the concentrate conduit is adjacent to the outlet end of the water conduit. A dispenser assembly is mounted on the mixing chamber. A strength valve is located in the concentrate conduit adjacent to the mixing chamber to control the flow of concentrate. An electrical circuit is provided including a means for adjusting the temperature of the water.

SUMMARY OF THE INVENTION

An object of the invention is to provide a device for producing a heated beverage solution from water and a liquid concentrate such as liquid coffee concentrate. More specifically, the device is preferably a coffee maker that is capable of brewing coffee in relatively small batches in a home, an office, or even a hotel suite or hospitality area.

A further object of the present invention is to provide a device that accepts and can house a replaceable source of shelf stable liquid coffee concentrate.

Another object of the present invention is to provide a device especially suited for the hospitality industry, wherein housekeeping chores can be reduced as well as thereby reducing housekeeping costs and time.

Still another object of the present invention is to provide a more sanitary solution to providing in-room coffee when compared to coffeemakers including a brew basket and filter, while maintaining a fresh, desirable cup of coffee.

A further object of the present invention is to provide a device that does not utilize a brew basket, which needs to be cleaned or replaced after each use, thereby also obviating the need for a filter pouch or coffee pack for each batch. Moreover, as there is no filter pouch or coffee pack to replace, there is no overwrap to discard, thereby providing a more environmentally friendly product with less waste than a conventional automatic drip coffee making device.

Another object of the present invention is to provide a device that can brew coffee directly into a drinking cup, with the coffee being freshly prepared upon demand.

Yet another object of the invention is to provide a source of heated water and liquid concentrate that can be provided to a mixing chamber or conduit in a desired predetermined ratio for mixing and further dispensing to a cup, mug or the like. The volume of the cold water reservoir determines the maximum volume of water for the batch to be produced, and the volume of the concentrate reservoir in the volumetric mix valve assembly determines the amount of concentrate that will be utilized to prepare the batch.

Still another object of the present invention is to provide a coffee maker including a volumetric mix valve assembly that transfers a predetermined volume of water and liquid concentrate to a chamber or conduit of the assembly and mixes the components together before or during release of the solution to a container, such as a cup, mug or the like. Alternatively, the components can be mixed after transfer to the cup. That said, it is an object of the present invention to provide a device for producing coffee from a liquid concentrate that is relatively inexpensive so that the apparatus is economically suitable for use in a home, office, a hotel suite or the like.

A further object of the present invention is to provide a volumetric mix valve assembly including a fixed volume concentrate reservoir that in a first position holds a fixed volume of a concentrate and is not connected to a mixing conduit such as an outlet, and in a second position is in communication with a mixing conduit and a hot water inlet, wherein both the fixed volume concentrate reservoir and hot water inlet are able to expel their contents into a suitable container. In a further embodiment, the volumetric mix valve assembly includes a second fixed volume concentrate reservoir that in one embodiment allows a user to select either regular coffee or decaffeinated coffee, for example.

In one aspect of the present invention, a coffee producing device for producing a heated liquid beverage composition from a liquid concentrate is disclosed, comprising a housing adapted to dispense a liquid composition comprising a liquid coffee concentrate and water, an actuatable volumetric mix valve assembly located in the housing and having an actuator capable of moving a valve from a first position to at least a second position, wherein in the first position the valve assembly operatively prevents flow of the liquid composition through an outlet of the valve assembly, the valve assembly having a concentrate inlet and a concentrate reservoir having a set volume and being in fluid communication with the concentrate inlet in the first position and adapted to operatively receive liquid coffee concentrate from a concentrate source, wherein in the second position the valve isolates the concentrate inlet from the concentrate reservoir, the valve assembly further comprising a water inlet adapted to receive water from a hot water receptacle through a hot water conduit connected to the inlet, wherein a seal member of the valve prevents flow of water into the concentrate reservoir in the first position, wherein in the second position the valve allows fluid communication between the water inlet, the concentrate reservoir, and the outlet of the valve assembly, at least a portion of the outlet arranged below the water inlet and the concentrate reservoir whereby the water and liquid coffee concentrate from the concentrate reservoir are adapted to flow via gravity out through the outlet in the second position, a water receptacle adapted for receiving water from a water source, a water heater operatively connected to the water receptacle by a conduit, a second conduit operatively connected between the water heater and the hot water receptacle for providing water heated by the water heater to the hot water receptacle, a concentrate receptacle adapted to be connected to the concentrate source comprising the liquid coffee concentrate; and a concentrate conduit operatively connected between the concentrate receptacle and the concentrate inlet of the valve assembly.

In another aspect of the present invention, a device for producing a beverage solution from a liquid concentrate is disclosed, comprising a receptacle for storing water, a volumetric mix valve assembly, a conduit connecting the receptacle to the volumetric mix valve assembly, a concentrate receptacle adapted to receive a liquid concentrate from a concentrate source, a concentrate conduit connecting the concentrate receptacle to the volumetric mix valve assembly for transporting the liquid concentrate, wherein the receptacle for storing water and the concentrate receptacle are located at a height greater than a maximum height of the volumetric mix valve assembly, wherein the volumetric mix valve assembly includes a fixed volume concentrate reservoir that is adapted to be filled with the liquid concentrate when a valve of the valve assembly is in a first position, and an activating mechanism operatively connected to the volumetric mix valve assembly, wherein upon activation of the activating mechanism, the valve moves to a second position wherein the fixed volume concentrate reservoir is in fluid communication with an outlet of the volumetric mix valve assembly and isolated from the concentrate conduit, and wherein in the second position, the receptacle for storing water and the conduit connecting the receptacle to the volumetric mix valve assembly are in fluid communication with the valve assembly outlet whereby the liquid concentrate and heated water are adapted to flow via gravity out through the outlet.

The present invention achieves these and other objects which will become apparent from the description that follows.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Coffee makers of the present invention are especially suited for brewing relatively small batches or volumes of coffee for applications such as in a home, office or hotel suite, utilizing a source of water and a liquid coffee concentrate, preferably shelf stable. That said, the size of the cold water receptacles of the coffee makers of the invention, in addition to the amount of liquid concentrate utilized, determine the maximum batch size. Preferably, the coffee makers can produce from 1 to about 12 five ounce cups of coffee per batch. The coffee maker devices of the present invention are desirable inasmuch as they do not need to have a filter and coffee grounds or filter pouch comprising coffee grounds replaced after each batch and are thus relatively low maintenance and more sanitary when compared to automatic drip coffee machines. That said, the coffee maker devices of the present invention are free of a brewing basket and therefore do not require and are free of a brew basket filter, and particulate coffee grounds. Moreover, the coffee maker devices of the present invention do not need a glass carafe that must be cleaned after each use. Accordingly, there is no glass carafe to sanitize or to be broken. Disposable waste is also minimized as no overwrap is needed to store individual or other servings of a filter pack including coffee.

Figure 1:
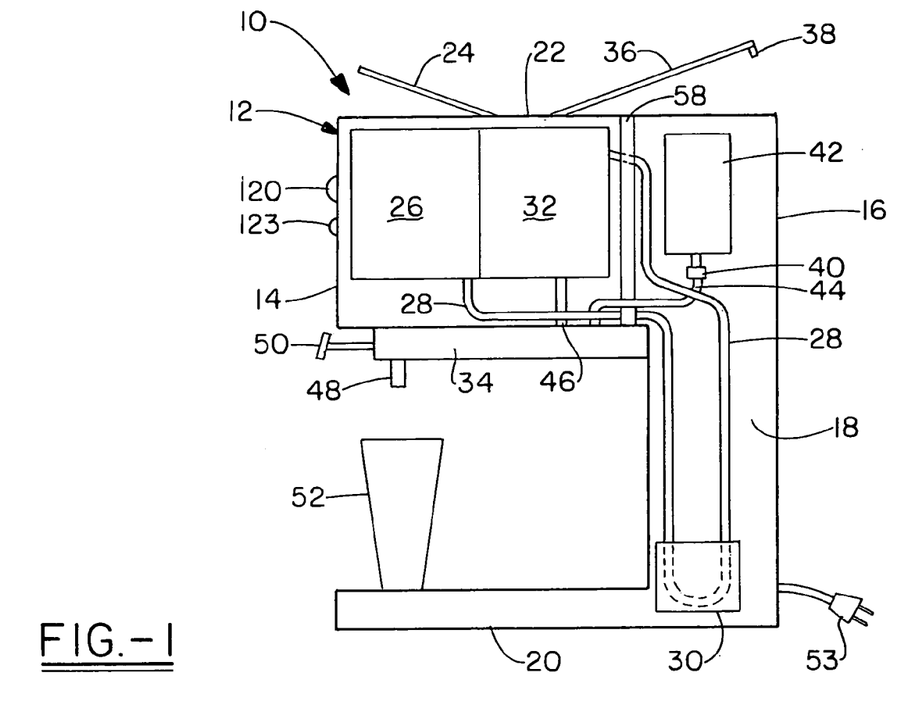
FIG. 1 is a partial side elevational view schematically illustrating one embodiment of a device of the present invention capable of producing coffee from water and liquid coffee concentrate.

Referring now to FIG. 1, one embodiment of a device, namely a coffee maker 10 of the present invention is illustrated. Coffee maker 10 is shown in a partial side view in FIG. 1 and includes a housing 12 that includes a front 14, back 16, sides 18, base or bottom end 20, and top end 22. Base 20 is preferably flat and adapted to sit on a horizontal surface such as a countertop. As known in the art, base 20 can be provided with feet or griping elements that increase friction between the coffee maker and the surface upon which it is adapted to rest. Alternatively, the coffee maker 10 can be provided with one or more fittings so the coffee maker can be hung from a surface, such as a wall.

Figure 5:
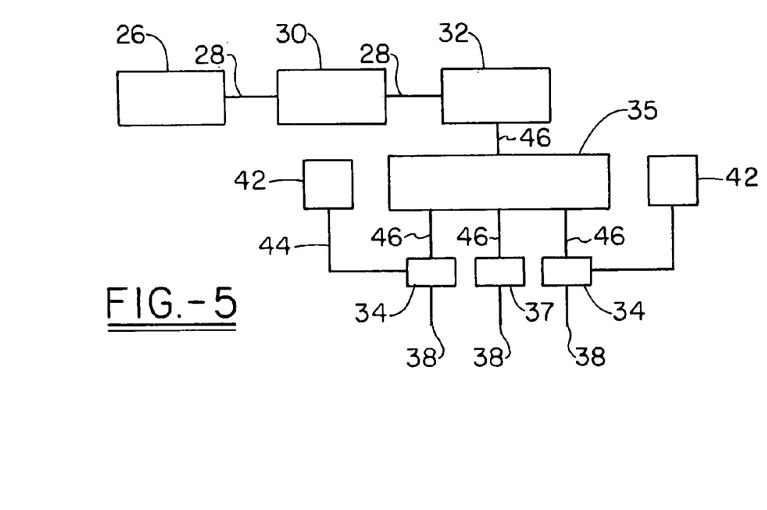
FIG. 5 is a schematic view of one embodiment of a flow diagram for a device of the present invention.

In one embodiment, coffee maker 10 includes an entry port or inlet, such as lid 24 that is preferably hinged to top 22 and provides access to a cold water receptacle 26 adapted to receive water from a source, such as supply line or a user of the coffee maker 10. Lid 24 also serves to prevent unwanted foreign matter such as dust, particulates, or the like from contaminating cold water receptacle 26. A conduit 28 extends between cold water receptacle 26 and a hot water receptacle 32 as schematically shown in FIG. 5. Water that flows through conduit 28 is heated by water heater 30. In one embodiment, a portion of the conduit 28 is a metal tube or a polymeric tube, or combinations thereof. Conduit 28 connected between heater 30 and hot water receptacle 32 preferably enters the receptacle 32 from generally an upper portion thereof so that water can be maintained within the receptacle 32 and a hot water conduit 46 until needed and backflow through conduit 28 is substantially prevented. Hot water receptacle 32 is located above the volumetric mix valve assembly 34 so that water is able to flow thereto by gravity.

In one embodiment as shown in FIG. 1, water heater 30 is a metal heating coil preferably connected to a thermal switch as known in the art and commonly utilized in automatic drip coffee makers. The heater 30 may be located in a neck portion of the housing 12 as shown in FIG. 1 and operatively connected to conduit 28. Water from cold water receptacle 26 travels through conduit 28 towards the back 16 of coffee maker 10, downwards towards the bottom end 20 thereof. In the back section of the housing, conduit 28 is preferably U-shaped. Water heater 30 is preferably operatively connected to the U-shaped portion of the conduit 28. The other end of the conduit 28 is open and connected to the top of the hot water receptacle 32. Water heater 30 is activated and when water is hot enough, i.e., boiling, steam and hot water are expelled through the open end of the conduit into hot water receptacle 32. When conduit 28 is dry after water has been heated, a thermal switch is deactivated and the water heater 32 is thus shut off. The water in the hot water receptacle 32 after heating is approximately 190° F. in one embodiment. The temperature can be varied in other embodiments. After heating and transfer to hot water receptacle 32, the water awaits transfer to a volumetric mix valve assembly 34, which is explained in detail herein.

In one embodiment cold water can be directly added to the hot water receptacle 32 and therefore transferred at a relatively cold temperature to the volumetric mix valve assembly 34. In this manner, "iced" coffee, which is a relatively popular drink can also be produced utilizing cold water and the liquid coffee concentrate in the devices of the present invention.

Accordingly, in one embodiment there are no pumps involved to produce heated water or move concentrate as further explained herein. In a further embodiment, coffee maker 10 has a single water receptacle and a water heater 30 located therein or operatively connected thereto. Any water placed in the receptacle is heated to a desired temperature and maintained therein or in a conduit between the receptacle and the volumetric mix valve assembly until ready for use and transfer to a volumetric mix valve assembly 34. The arrangement, including a cold water receptacle and a hot water receptacle, is preferred as it provides a gurgling or bubbling sound during heating of the water, which is pleasing to the average user.

Housing 12 includes a second entry port or inlet, such as lid 36 designed to provide access to at least an interior area of the housing 12 where a concentrate receptacle 40 is located. Concentrate receptacle 40 is adapted to be connected to a source of liquid coffee concentrate, such as container 42. The housing is large enough to hold a desired size of container 42 of concentrate. For example, liquid concentrate containers can be utilized having a volume of about 2 to about 8 ounces, and preferably about 4 ounces. At a water to concentrate ratio of about 69:1, a four ounce bag would produce about fifty-five five ounce cups of coffee. In one embodiment, concentrate receptacle 40 includes a probe which provides a seal in combination with an outlet of container 42. Such probes and concentrate container connection assemblies are known in the art and described, for example, in U.S. Patent Application Publication No. 2006/0169148, herein incorporated by reference. The concentrate container 42 is preferably mounted in the upper portion of coffee maker 10. As explained hereinbelow, as the concentrate container is in the upper portion of the housing 12, the liquid coffee concentrate can be transferred gravitationally, without the use of a pump, to the volumetric mix valve assembly 34 through a concentrate conduit 44.

The concentrate container 42 in one embodiment is a flexible or pliable pouch, preferably able to collapse via a vacuum as the concentrate therein is utilized. Container 42 is preferably recyclable or disposable after use. The concentrate container includes a fitting adapted to be connected to or mated with a fitting of the concentrate receptacle 40, such as a probe thereof. The container 42 preferably remains sealed until suitably connected to the concentrate receptacle 40.

If it is desirable that coffee maker 10 is to support multiple types of concentrate, two or more concentrate conduits 44 and likewise two or more volumetric mix valve assemblies 34 can be present within housing 12. Alternatively, in one embodiment, the concentrate for use in the present invention can be a liquid other than coffee, such as tea or even hot chocolate.

Lid 36, in a preferred embodiment, is provided with a locking mechanism 38, such as a keyed lock, combination, or other security feature that enables an authorized user, such as a housekeeper in the case of hotel use, to gain access to the interior area of the housing 12 where the concentrate is stored. Lid 36 of housing 12 is locked to prevent tampering by the hotel guests with the hot water reservoir. The locking mechanism can also be utilized to prevent a guest from opening the concentrate compartment and tampering with, damaging, or removing the concentrate. Preferably, lid 36 remains locked except for maintenance and replacement of coffee.

One embodiment of a volumetric mix valve assembly 34 is shown in FIG. 1. The valve assembly 34 has a structure that enables a fixed ratio of concentrate to water to enter the valve assembly 34 per batch, be mixed or contacted to each other in some manner to form a solution and dispensed from coffee maker 10 through an outlet 48. The valve assembly 34 is configured so that a finite quantity of concentrate is released into or present in a mixing chamber such as the fixed volume concentrate reservoir 68 of the assembly 34 prior to, after, or concurrently with the release of water into the valve assembly 34. A vent tube 58 is provided to vent valve assembly 34. Vent tube 58 can also serve as a gauge in order to determine the amount or level of coffee remaining in concentrate container. In this case, the housing 12 is preferably provided with a window such as a preferably transparent section so that the level of concentrate in vent tube 58, in this case also preferably transparent or translucent, can be viewed without having to open the housing 12.

Figure 2:
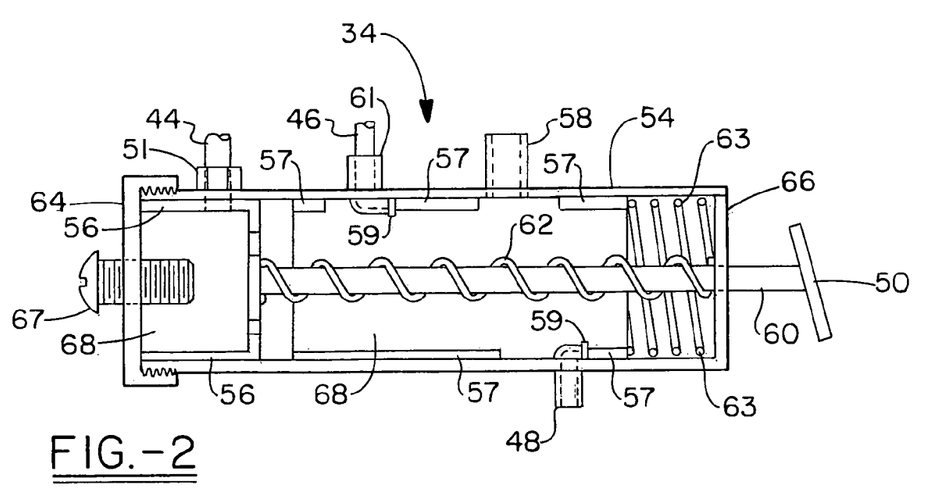
FIG. 2 is a partial side elevational view schematically illustrating one embodiment of a portion of the device including a volumetric mix valve assembly.

A detailed view of the volumetric mix valve assembly 34 of FIG. 1. is illustrated in FIG. 2. The volumetric mix valve assembly 34 includes a cylinder 54 which serves as a housing for the valve workings contained therein. The embodiment shown includes a two stage valve or piston assembly. A first movable piston 56 is contained within cylinder 54 and is disposed against the rear end portion 64 of the assembly by first spring 62 situated between an end of piston 56 and an inner wall of the front end 66 of cylinder 54. The valve assembly 34 is shown in the closed position in FIG. 2. Valve assembly 34 is provided with a concentrate inlet 51 which is operatively connected to concentrate conduit 44. The fit between piston 56 and cylinder 54 is such that a finite volume of liquid concentrate is admitted into cylinder 54, preferably while the valve is in the closed position and handle 50 is not actuated. In the closed position, the concentrate inlet 51 is open to the fixed volume concentrate reservoir 68 and concentrate flows through conduit 44 through inlet 51 and into the fixed volume concentrate reservoir 68. Air escapes through vent 58 and vent 58 is filled to a level determined by the amount of concentrate present in concentrate container 42, as well as in the concentrate conduit 44. The vent 58 is preferably transparent or translucent when utilized as a gauge. Vent 58 preferably extends above the upper end of concentrate container 42 such that no concentrate will exit vent tube 58 and likewise above the water level in the hot water receptacle 32. In one embodiment, the concentrate in vent tube 58 exits the tube and is mixed with water and expelled through outlet 48. In a further embodiment, a portion of a second piston 57 blocks or seals the vent tube 58 after the valve assembly 34 is actuated to an open position and any concentrate within vent tube 58 cannot enter the fixed volume concentrate reservoir 68 is returned to the unactuated position. When the valve assembly 34 is in the closed or unactuated position, the opening to hot water receptacle 32 and outlet 48 are closed. Valve assembly 34 and second piston 57 includes seals 59 which are biased against outlet 48 and hot water inlet 61 by second spring 63 connected between front end 66 of housing 54 and an end of cylinder. Hot water inlet 61 is operatively connected to hot water conduit 46. When the valve assembly 34 is activated, such as utilizing handle 50, piston 56 is urged through rod 60 toward the front end 66 of cylinder 54. As piston 56 moves forward, the concentrate inlet 51 is occluded and thereby closed by piston 56. The front end of piston 56 abuts the rear end of piston 57, thereby urging piston 57 forward towards the front end of cylinder 54. Thereby, the inlet 61 to the hot water receptacle 32 into cylinder 54 is opened and hot water flows through inlet 61 from hot water conduit 46 and into the fixed volume concentrate reservoir of cylinder 54, wherein the hot water mixes with the concentrate and forces the concentrate out through the now open outlet 48 and into a container 52 until handle 50 or other activating mechanism is deactivated or released. When handle 50 is released, preferably after flow of the beverage solution has stopped, springs 62 and 63 urge pistons 56 and 57 to the closed position, as illustrated in FIG. 2. When the valve assembly 34 is in the open position, no concentrate is permitted to flow from the inlet 51 into cylinder 54 of the volumetric mix valve assembly 34 in the embodiment illustrated. Thus, accurate, reproducible batches of hot coffee are obtained.

In a preferred embodiment, the volumetric mix valve assembly 34 is provided with a concentration adjustment member 67 as illustrated in FIG. 2. Concentration adjustment member 67 is utilized to change the volume of the fixed volume concentrate reservoir 68 and can thereby increase or decrease the amount or volume of concentrate present therein, and thereby adjust the strength of the beverage solution produced. In one embodiment, concentration adjustment member 67 is a screw which is threadedly received in the rear end 64 cap of volumetric mix valve assembly 34.

If desired, various seals can be utilized in order to prevent leakage between the various orifices present in the volumetric mix valve assemblies of the present invention. Also, in one embodiment, a one-way check valve is provided operatively connected to the volumetric mix valve assembly to prevent backflow of concentrate, hot water, or both. The volumetric mix valve assembly can also contain baffling in order to create optimum mixing as desired. Mixing can take place as the water and concentrate flows into the cup. Further mixing can be accomplished using a stir stick or other utensil in the cup.

Figure 3:
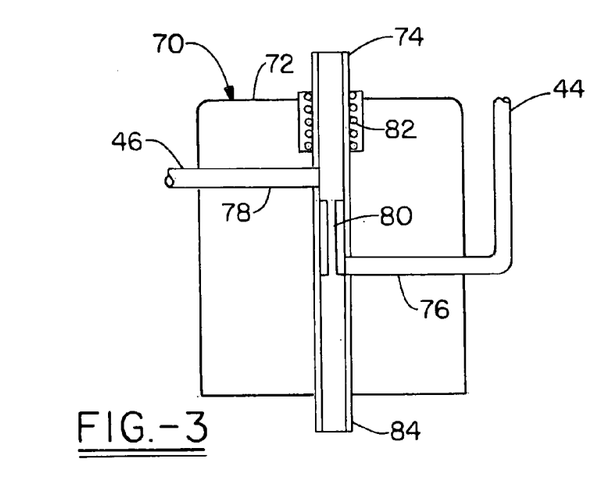
FIG. 3 is a partial elevational view schematically illustrating a further embodiment of a portion of a volumetric mix valve assembly for use in the present invention.

A second embodiment of a volumetric mix valve assembly 70 is illustrated in FIG. 3. Second valve assembly 70 includes a housing 72, a hot water inlet 78 to which hot water conduit 46 is connected. Assembly 70 also includes a concentrate inlet 76 to which concentrate conduit 44 is connected. Actuator rod 74 includes a portion that extends within housing 72 of valve assembly 70 and is operatively connected thereto utilizing spring 82 to maintain the valve assembly in a closed position as shown until activation. In the closed position, an amount of liquid concentrate fills concentrate reservoir 80 gravimetrically as the concentrate source is located higher than reservoir 80. Rod 74 is self vented and a portion of the vent extends above the top of the concentrate bag and preferably the water level in the hot water receptacle in order to allow desired filling of the reservoir with concentrate. When rod 74 is actuated and moved to an upper, open position, the concentrate inlet 76 is sealed by a portion of rod 74 water from hot water receptacle 32 passes through conduit 46 and hot water inlet 78 into reservoir 80 thereby mixing with the volume of concentrate therein. The solution flows downward through outlet 84 and out of the coffee maker.

Figure 4A:
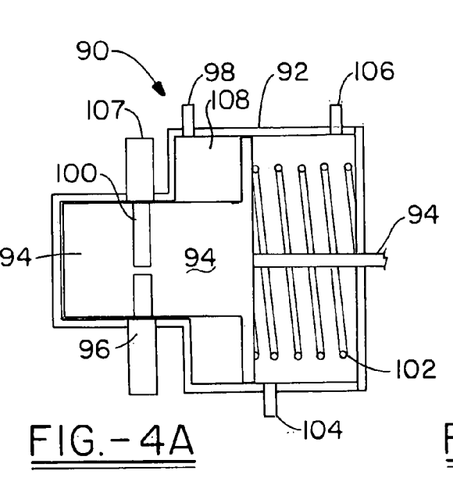
FIGS. 4A and 4B schematically illustrate a further embodiment of a volumetric mix valve assembly for the present invention showing respectively, a valve in a closed position and an open position.
Figure 4B:
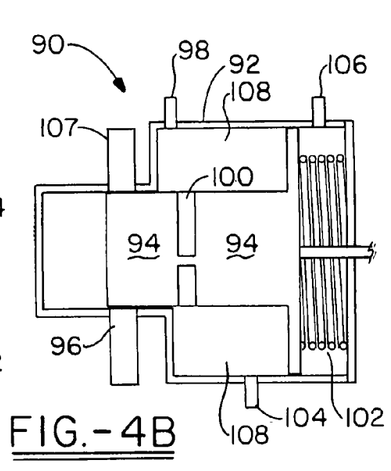

A further embodiment of a valve assembly through a volumetric mix valve assembly 90 is illustrated in FIGS. 4A and 4B. Volumetric mix valve assembly 90 includes a housing 92 in which an actuator 94 is located. Valve assembly 90 also includes a concentrate inlet 96 adapted to be connected to a source of concentrate and a water inlet 98 adapted to be connected to a source of hot water. FIG. 4A shows the actuator 94 of valve assembly 90 in a closed position. In the closed position, coffee concentrate is able to gravimetrically flow into fixed volume concentrate reservoir 100 in order to dispense a predetermined amount or fixed volume of concentrate. Concentrate reservoir 100 is operatively connected to vent 107 which allows concentrate to enter reservoir 100. Water inlet 98 can be located on the upper or lower side of housing 92, preferably on the upper side in order to allow better flushing. In this embodiment, hot water is allowed to enter mixing chamber 108 in the closed position. When actuator 94 is actuated by an activating mechanism, such as a handle or lever, the actuator moves towards the right side of the housing 92 thereby allowing the coffee concentrate located in fixed volume concentrate reservoir 100 to enter the mixing chamber 108 thereby mixing with hot water. When the activator is moved to the open position, the concentrate inlet 96 is closed and no further concentrate is allowed to flow into the valve assembly 90. The solution mixture exits the valve assembly 90 through outlet 104. Spring 102 is utilized to maintain the actuator in a closed position. Vent 106, preferably having a height greater than the concentrate in the concentrate container as well as the water level in the hot water receptacle is provided to allow gases to escape the assembly.

FIG. 5 illustrates a schematic view of one embodiment of the present invention, wherein the coffee maker includes multiple concentrate sources and beverage solution outlets. In this case, the system shown includes three outlets, one outlet for a regular coffee solution derived from liquid regular caffeinated coffee concentrate and water, a second coffee solution adapted to be formulated from liquid decaffeinated coffee concentrate and water and a hot water outlet. In the embodiment, a cold water receptacle 26 is utilized to house water placed in the coffee maker. Afterwards, the cold water is transferred through conduit 28 past water heater 30 and then to hot water receptacle 32. In one embodiment, water from hot water receptacle 32 is permitted to exit hot water receptacle 32 through conduit 46 and flow into manifold 35 and through conduit 46, wherein the hot water is ready for dispensing through any of the outlets 48. Preferably, the length of conduit 46 is minimized or even absent and the volumetric mix valve assemblies 34 or hot water valve 37 are directly connected to manifold 35 or the manifold 35 is not present. In one embodiment, the manifold can be part of the hot water receptacle 32. Thereby, water could exit hot water receptacle 32 through two or more conduits, each connected a valve such as a volumetric mix valve assembly or a straight valve in the case of hot water. Upon activation, the hot water flows through the desired activated valve and mixes with the liquid coffee concentrate, if present. Two of the valve assemblies are volumetric mix valve assemblies 34 as described hereinabove, wherein a concentrate is mixed with the heated water before flowing through the outlet 48 into a container. As the hot water outlet is not connected to any volumetric mix valve assembly, water runs directly from the hot water receptacle through the outlet 48 without contacting any of the components that are in contact with coffee concentrate. Since the water draws directly from the hot water receptacle, coffee flavor will not be present, which can be objectionable to non-coffee drinkers.

Figure 6:
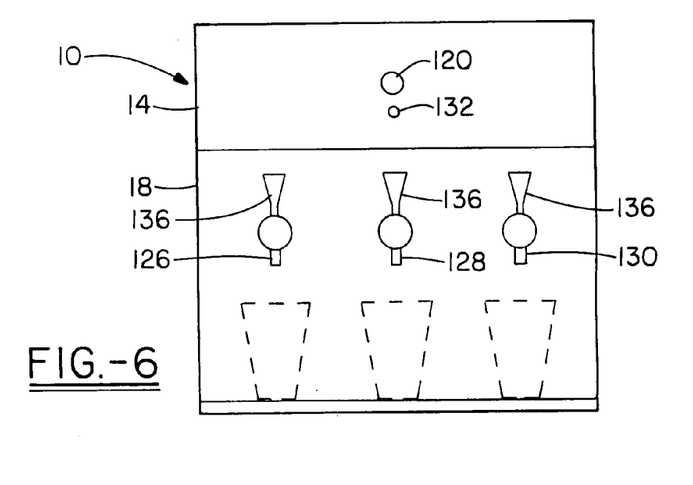
FIG. 6 is a front view of one embodiment of a device of the present invention, including multiple dispensing orifices.

One embodiment of the front 14 of a coffee maker 10 is illustrated in FIG. 6. In this case, coffee maker 10 is capable of brewing or providing three different hot solutions as three outlets 126, 128 and 130 are present, such as utilizing the arrangement shown in FIG. 6. Front 14 of coffee maker 10 includes a switch 120. The user actuates the switch 120, preferably after a required amount of water is added to the cold water reservoir, if necessary and indicator light 132 is lighted. The water flows through the water heater where it is heated and then into the hot water receptacle. When the required amount is in the hot water receptacle, the indicator light 132, is deactivated. A valve for the desired volumetric mix valve assembly is activated, preferably by hand using lever 136, in the case where coffee is selected, and a predetermined volume of coffee concentrate and hot water flows through the mix valve assembly. After all the water is heated, the heater shuts off. The solution, including the hot water and concentrate, is also poured utilizing actuator handle 136 of the appropriate outlet 126, 128 and 130.

Figure 7:
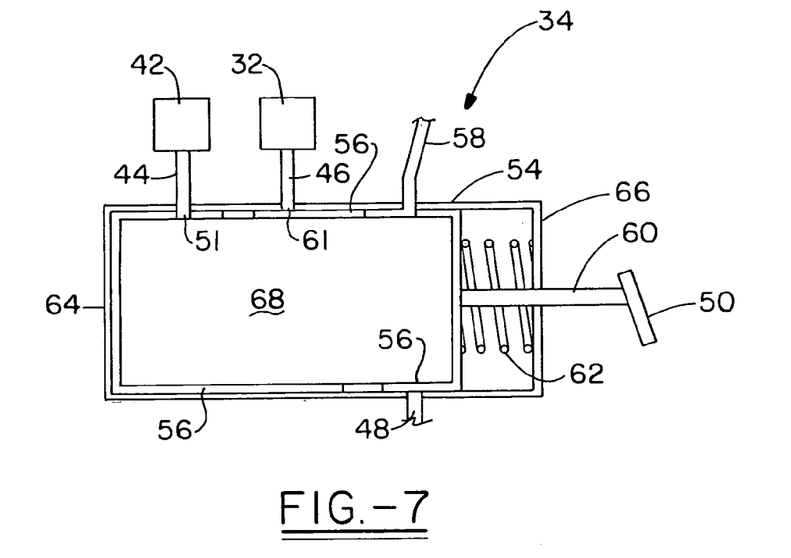
FIG. 7 is a partial side elevational view schematically illustrating one embodiment of a portion of the device including a volumetric mix valve assembly.

A further embodiment of a volumetric mix valve assembly 34 is illustrated in FIG. 7. The embodiment illustrated includes a single stage valve or piston 56 contained within cylinder 54 and disposed, in a first position, a closed position, against a rear end portion 64 of the assembly by spring 62 situated between an end of piston 56 and an inner wall of the front end 66 of cylinder 54. In this embodiment, valve assembly 34 is provided with a concentrate inlet 51 operatively connected to concentrate conduit 44. In the closed position shown, the concentrate inlet 51 is open to the fixed volume concentrate reservoir 68, then concentrate flows through conduit 44 through inlet 51 and into the fixed volume concentrate reservoir 68. Air escapes through vent 58. Vent 58 can also be filled to a level as described hereinabove with concentrate whereby the vent can be utilized as a gauge. In the closed, unactuated position, the opening to hot water receptacle 32 and outlet 48 are closed. When valve assembly 34 is activated utilizing handle 50 or other activating apparatus connected to rod 60 in turn connected to piston 56, piston 56 is urged forward towards the front end 66 of cylinder 54. As the piston moves forward, the concentrate inlet 51 is occluded and thereby closed or sealed by piston 56. An opening in piston 56 exposes hot water to conduit 46 and hot water flows through inlet 61 into the fixed volume concentrate reservoir 68 wherein the hot water mixes with the concentrate, both which exit the assembly through now open outlet 48 which is also exposed when cylinder is activated. When handle 50 is released, spring 62 returns piston 56 to the closed position as illustrated in FIG. 7. When valve assembly 34 is in the open position, no concentrate is permitted to flow from inlet 51 into cylinder 54 of volumetric mix valve assembly 34. There, accordingly, a finite volume of coffee and water are processed and mixed during a single cycle of the valve assembly of the coffee maker of the present invention.

The volumetric mix valve assembly of the present invention is supplied water from the hot water reservoir by gravity, and concentrate from liquid concentrate source by gravity. The mixing chamber of the volumetric mix valve assembly causes the concentrate in water to mix by swirling within the mixing chamber. Moreover, the outlet nozzle of the coffee maker also continues mixing of the concentrate and hot water. The mixed solution is delivered from the bottom of the nozzle to desired container 52. Coffee maker 10 of the present invention also includes a power source 53, preferably providing 110 volt alternating current. In a preferred embodiment, the activation of the heater and brew light are electrically operated as known in the art. When the heater runs dry from lack of water, the brewer will shut off and the light will go off. Manual operations to be performed are loading the desired amount of water into the cold water receptacle and opening and closing the actuator valve for the desired beverage solution.

Figure 8:
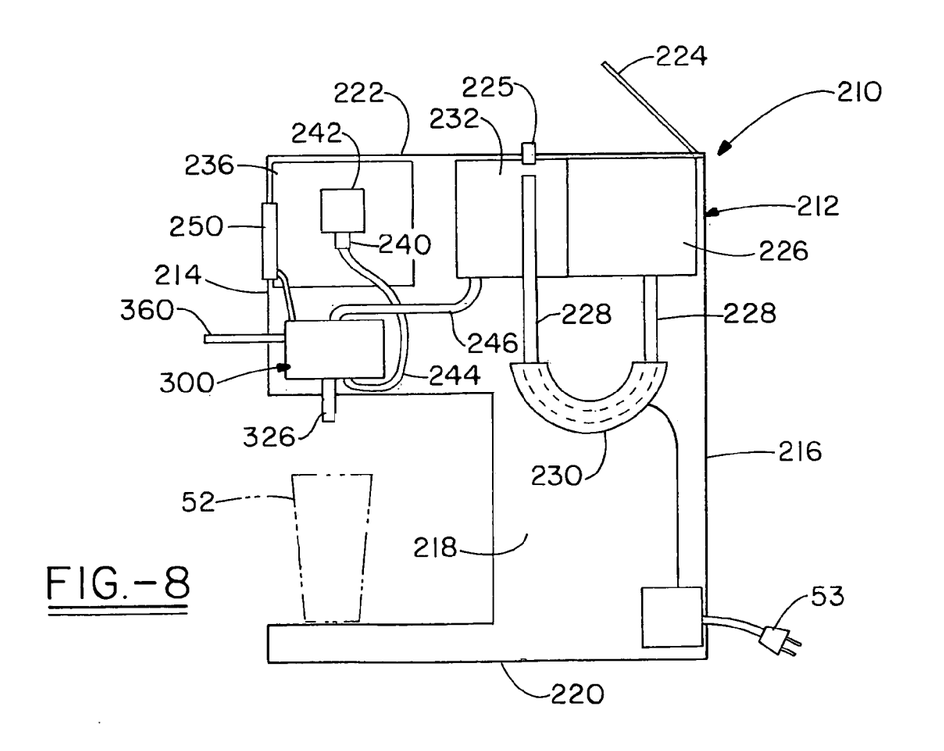
FIG. 8 is a partial side elevational view schematically illustrating one embodiment of a device of the present invention capable of producing coffee from water and liquid coffee concentrate.
Figure 9:
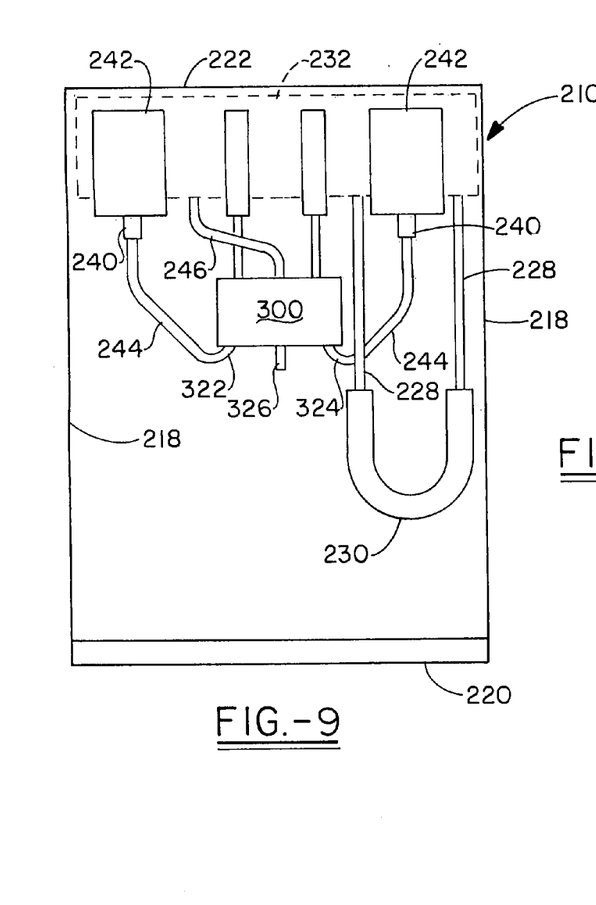
FIG. 9 is a partial front view schematically illustrating one embodiment of a portion of the device illustrated in FIG. 8.

A further embodiment of a coffee maker 210 of the present invention is illustrated in FIGS. 8 and 9. Coffee maker 210 includes a housing 212 having a front 214, back 216, sides 218, a base or bottom 220, and a top 222. Base 220 can be configured for example as described for base 20 disclosed hereinabove. Coffee maker 210 includes a reservoir or cold water receptacle 226 wherein water from a source such as a supply line or user of the coffee maker can be placed as desired in order to produce a beverage within the coffee maker 210.

In one embodiment, lid 224 is present to provide access to the cold water receptacle 226 and likewise prevent unwanted foreign matter from contaminating the device. A conduit 228 extends between receptacle 226 and a water heater 230 operatively connected to a power source for heating water to a desired temperature such as described herein. A second conduit 228 is connected between water heater 230 and hot water receiving tank or receptacle 232. Preferably conduit 228 or a tube or line connected thereto extends upward in the receptacle 232 a sufficient distance to allow for desired level of water to be housed within receptacle 232 without allowing backflow into conduit 228. A vent 225 is preferably present in coffee maker 210, such as located above hot water receptacle 232 to allow steam or moisture derived from the heating process to exit coffee maker 210. Water placed in the cold water receptacle 226 flows downward by gravity through conduit 228 into water heater 230, wherein it is heated when water heater 230 is activated and subsequently expelled through the open end of the conduit 228 extending into hot water receptacle 232. As indicated hereinabove, water heater 230 includes a thermal switch in order to deactivate the water heater when the water heater is dry after all desired water has been heated. After heating, water in receptacle 232 awaits transfer into a volumetric mix valve assembly through hot water conduit 246. Due to gravitational forces, some water is present in hot water conduit 246 and hot water inlet 316 of the volumetric mix valve assembly 300. In a preferred embodiment, a check valve is present between the water heater 230 and the cold water receptacle 226 in order to prevent backflow of heated water into the cold water reservoir 352. The size of the opening in the outlet of the water heater or the entrance to the hot water reservoir can be utilized to control the temperature of the water in some embodiments. Generally, the smaller the opening the hotter the water temperature will be. In one embodiment preferred water temperature ranges from about 165° F. to about 180° F.

Volumetric mix valve assembly 300 is located towards the front end of coffee maker 210 and is operatively connected to outlet 326 of the coffee maker 210 which expels hot water and coffee concentrate such as explained herein. Volumetric mix valve assembly 300 is adapted to receive coffee concentrate such as from a liquid coffee container 242 through a concentrate conduit 244 connected to a concentrate receptacle 240. Concentrate receptacle 240 is an appropriate fitting mateable with the liquid coffee container 242. As gravitational flow of liquid coffee concentrate is desired by the present invention, the coffee container 242 is located in coffee maker 210 above the volumetric mix valve assembly 300.

Figure 10:
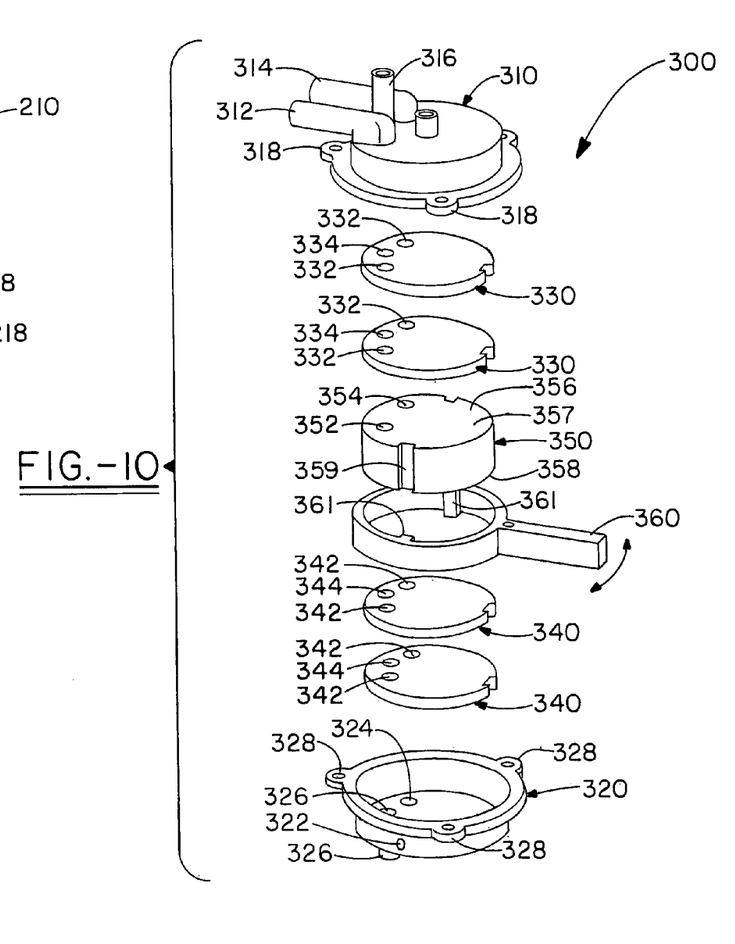
FIG. 10 is an exploded perspective view of one embodiment of a volumetric mix valve assembly.
Figure 11:
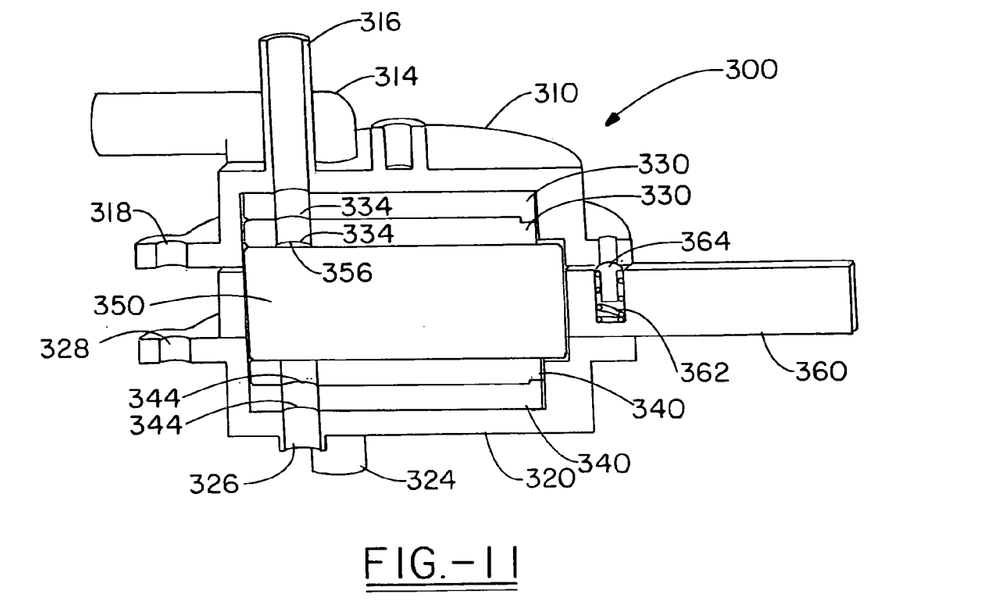
FIG. 11 is an assembly view schematically illustrating the volumetric mix valve assembly illustrated in FIG. 10.

Volumetric mix valve assembly 300 is particularly illustrated in FIGS. 10 and 11. Valve assembly 300 includes an upper housing 310 connected to a lower housing 320 by any suitable means, such as an adhesive or fastener such as by fixing connector apertures 318 and 328. Upper housing 310 includes a first housing sight gauge and vent line 312 and a second housing sight gauge and vent line 314. Lines 312 and 314 are connected to a sight gauge member 250 through a suitable conduit. Member 250, as illustrated in FIG. 8, is provided with a transparent section in one embodiment so that the level of concentrate present in the liquid coffee container 242 can be visually determined. In this manner, the user can easily determine whether or not container 242 needs to be replaced with a full or new container. Sight member 250 also serves as a vent and is open to the atmosphere, preferably at an upper end thereof having a height greater than the highest level of concentrate in container 242, thereby allowing air to exit the valve assembly 300 at an appropriate time in order to allow refilling of a concentrate reservoir. By providing sight member 250 with a translucent or transparent portion in one embodiment, the housing 12 of coffee maker 210 does not need to be opened in order to determine the amount of concentrate remaining in the liquid coffee container 242. Upper housing 310 further includes a hot water inlet 316 that is connected to hot water conduit 246, such as illustrated in FIG. 8. Situated below the upper end of the upper housing 310 are one or more upper seals 330 in one embodiment. Each upper seal 330 when present includes one or more concentrate orifices 332 in fluid, i.e., concentrate, communication with the respective housing sight gauge vent line 312 or 314. Upper seal 330 also includes a water orifice 334 operatively disposed below and in fluid communication with hot water inlet 316. The upper seal 330 or lower seal 340 as described herein below, each, independently, can be made from any material that provides a desired seal. Each seal present may be of a different composition than another seal if present in the valve assembly. In one embodiment, the upper most seal 330 and lower most seal 340 comprises silicone. The intermediate upper seal 340 and lower seal 340 are ceramic in one embodiment. In other embodiments, any of the seals can be a material that is Teflon coated.

Lower housing 320 includes an outlet 326 for releasing concentrate and water upon appropriate activation of the volumetric mix valve assembly 330, into any suitable container as described herein. The outlet 326 also serves as a mixing chamber or conduit as both liquid coffee concentrate and hot water flow therethrough upon appropriate activation of the volumetric mix valve assembly. Lower housing 320 also includes one or more concentrate inlets such as concentrate inlets 322 and 324 as shown. As illustrated in FIG. 10, one or more lower seals 340 are preferably, but optionally present. Each lower seal 340 includes a desired number of concentrate orifices 342 each operatively connected to a separate concentrate inlet such as 322, 324. Lower seal 340 also includes a water and concentrate orifice 344 operatively connected to outlet 326. In some embodiments, the upper and lower seals are absent when a desired seal can be maintained between the housings 310, 320 and valve 350.

Valve 350 is an important component of volumetric mix valve assembly 300. Valve 350 controls dispensing of water and coffee concentrate through outlet 326. An actuator or lever 360 is operatively connected to valve 350 for activation by a user as explained herein. In the embodiment illustrated in FIG. 10, lever 360 has a pair of projections 361 which can be received in slots 359 of valve 350 in order to provide rotation or actuation of valve 350. Valve 350 includes an upper surface 357 spaced apart from a lower surface 358. A first fixed volume concentrate reservoir 352 extends between the upper surface 357 and lower surface 358 in valve 350 and provides a defined volume for housing a concentrate therein that can be dispensed upon activation. Reservoir 352 can have any desired volume, for example from about 0.5 to about 100 ml, and preferably from about 1 to about 75 ml. The volume of reservoir 352 can be varied based upon factors such as ratio of concentrate to water as well as the amount of coffee or other mixture desired to be produced. The concentrate reservoir 352 has an orifice on each of the upper surface 357 and lower surface 358 to provide for flow of concentrate therethrough and also allow release of air therefrom to facilitate refilling with additional concentrate. The shape of concentrate reservoir 352 is not limited to any particular form. The main requirement is that the reservoir volume be sufficient to contain a desired amount of concentrate in order to produce the desired quantity of coffee upon the combination of concentrate in the reservoir with a desired amount of water. In an embodiment where more than one concentrate is desired to be dispensed, a second fixed volume concentrate reservoir 354 is provided in valve 350. The upper surface 357 is provided with a hot water seal member 356, which is generally a plug or barrier surface located below one or more of the upper seal water orifice 334 and hot water inlet 316 and prevents hot water from flowing completely through the valve 350 in a non-actuated position, such as shown in FIG. 11. As hot water receptacle 232 has hot water conduit 246 connected to the bottom thereof, some hot water flows from receptacle 232 through hot water conduit 246 and into valve 350 through hot water inlet 316. Water entering inlet 316 flows downward through upper seal water orifice 334 and is prevented from further downward movement by hot water seal member 356 in valve 350 in a non-actuated position.

When a liquid coffee container 242 is connected to a concentrate receptacle 240, concentrate flows through conduit 244 attached to the concentrate receptacle 240 and downward into a concentrate inlet such as 322 or 324 in the lower housing 320 of the volumetric mix valve assembly 300. As the level of the concentrate in liquid coffee container 242 is higher than the entire volumetric mix valve assembly 300 as the container 242 is located above the valve assembly 300, concentrate flows down through conduit 244 and then into the connected concentrate inlet 322 or 324 through the concentrate orifice 332 in the lower seal 340, through the fixed volume concentrate reservoir such as 352 or 354 of valve 350, up through an upper seal concentrate orifice 332 and out of the valve assembly 300 through a housing sight gauge vent line 312 or 314 and into the sight gauge vent member 250 until reaching an equilibrium with the level of concentrate in liquid coffee container 242. Any air within the system is vented out through the top of vent member 250. Accordingly, a fixed volume of coffee concentrate is present in the appropriate fixed volume concentrate reservoir 352 or 354 and ready for dispensing. When lever 360 is actuated, such as shown by the direction of the arrows in FIG. 10, with the movement being in a generally radially direction when compared to a central area of valve 350, the body of valve 350 also rotates, generally transversly to an axis extending through hot water inlet 316 and outlet 326. In this manner, one of the fixed volume concentrate reservoirs 352 or 354 is co-aligned with water concentrate orifice 344 when present and outlet 326 below the valve 350, and water orifice 344 when present and hot water inlet 316 located above valve 350. As such, the coffee concentrate within the concentrate reservoir is contacted with the heated water in the hot water inlet 316 and the solution gravitationally falls or travels downward through the water and concentrate orifice 344 and out through outlet 326 of the volumetric mix valve assembly 350. In one aligned, valve-open dispensing position, the water and concentrate mix as they flow downward through the outlet 326 and out of the coffee maker 210.

In one embodiment, a spring 362 and an indicator 364 can be utilized to designate a neutral position within the valve assembly 300. After flow ceases from outlet 326, when the concentrate within the concentrate reservoir and the hot water from hot water receptacle 232 has been exhausted, the lever 360 can be moved back to a neutral or non-dispensing position, such as shown in FIG. 11 and a coffee making cycle can be repeated. It is important to understand that as the valve 350 is actuated or rotated, the concentrate in one of the fixed volume concentrate reservoirs becomes isolated from concentrate not located within the reservoir itself, for example concentrate found in the structure located above valve 350 such as concentrate orifice 332, housing sight gauge vent line 312 or 314, and within member 250; as well as concentrate located in the concentrate orifice 342 of lower seal 340, a concentrate inlet 322 or 324 of lower housing 320 and conduit 244 connected between valve assembly 300 and concentrate container 242.

Air that is present in one of the concentrate reservoirs after dispensing is drawn upward through the valve assembly 300, through the housing sight gauge vent line 312 or 314 and out through vent member 250 when the valve lever 360 is moved back to the non-actuated, initial position as concentrate from liquid coffee container 242 again gravitationally flows into the fixed volume concentrate reservoir and reaches an equilibrium, thereby refilling the concentrate reservoir.

Figure 12:
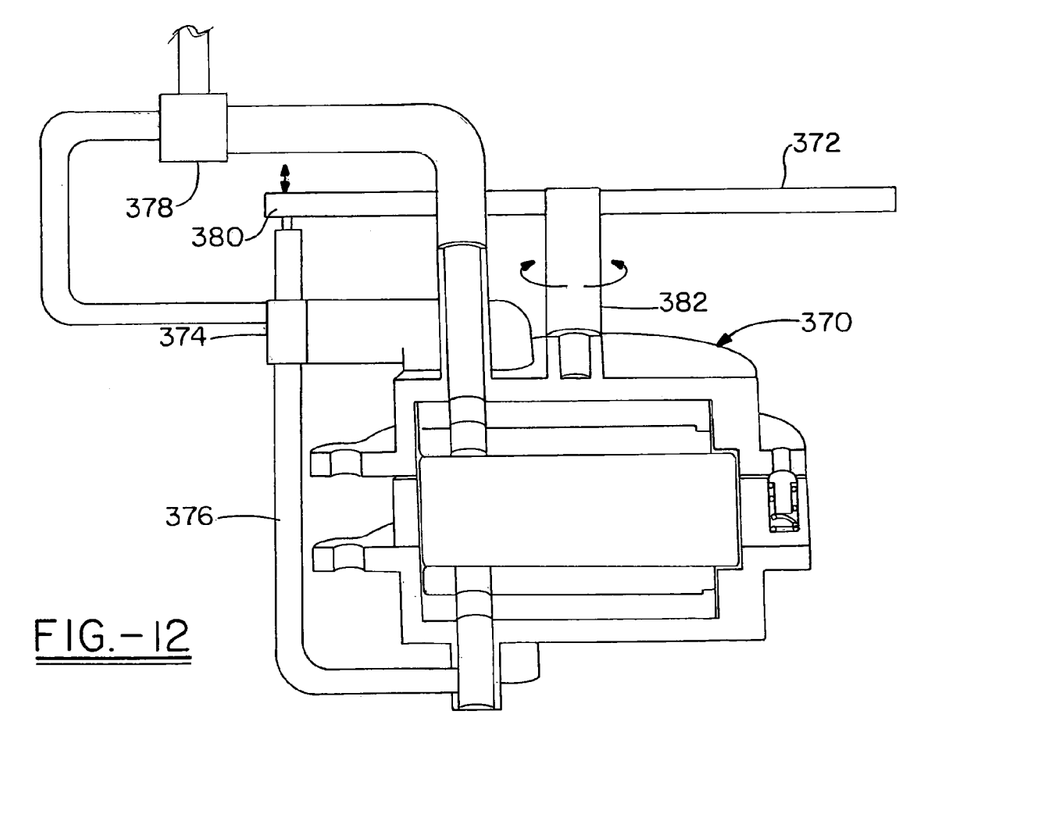
FIG. 12 is a view similar to FIG. 11, but schematically illustrating an alternative embodiment of the volumetric mixed valve assembly including a bypass port for the discharge of heated water only.

In a further embodiment of the present invention, a hot water bypass valve is provided in order to provide hot water directly to an outlet of the device and a valve assembly, such as valve assembly 370, which is in one embodiment identical to valve assembly 300, such as shown in FIG. 12. In such an embodiment, a conduit leading from a hot water receptacle to a T-connector 378, or other suitable connector. One outlet line from the T-connector 378 is connected to hot water valve 374. An actuator such as 3-way lever 372 includes a valve actuator 382 and a water only actuator 380. The valve actuator is actuated by rotating the 3-way lever 372, whereas the water only actuator 380 is actuated by moving 3-way lever 372 in another direction, such as up or down relative to water valve 374. When a suitable component of hot water valve 374 is actuated, water is able to flow through the hot water valve 374 into water conduit 376 and into the outlet of the device and further into a suitable container.

The arrangement of structure of the coffee maker of the present invention allows the concentrate to flow by gravity from the liquid coffee container 42 to a volumetric mix valve assembly, such as 34, 70, 90, 300 or 370. Water in the hot water receptacle 32 also flows by gravity to a volumetric mix valve assembly. The water heater of the device holds the water temperature at approximately 190° F. Activating one cycle of the coffee maker allows a substantially fixed, finite volume of concentrate and water to be mixed in the volumetric mix valve assembly and supplied to an outlet of the coffee maker.

In a further embodiment, one or more covers such as a door can be provided to conceal or hide activating handles or spigots until the coffee maker is desired to be utilized. The cover can be operatively connected to the device in one embodiment so that the door is only open by activation of the device. This would prevent theft of the concentrate from the spigots, one cup at a time.

The present coffee maker devices provide many advantages. The use of gravity to transfer both water and the concentrate to the volumetric mix valve assembly eliminates the need for one or more pumps. Moreover, the volume of coffee concentrate is specifically controlled and allows for reproducible batches of coffee to be produced. The cost of the apparatus is reasonable such that home, office, and hotel suite use is able to be achieved. The volumetric mix valve assembly provides excellent mixing. The coffee making device of the present invention also provides reduced housekeeping costs and time, as well as lower in-room coffee costs. In the coffee maker of the present invention there are no brew baskets or carafes to clean or replace. There is also no filter pouch or overwrap to discard. Fresh coffee is provided with every cup and brewed directly thereinto.

In accordance with the patent statutes, the best mode and preferred embodiment have been set forth; the scope of the invention is not limited thereto, but rather by the scope of the attached claims.

What is claimed is:

1. A coffee producing device for producing a heated liquid beverage composition from a liquid concentrate, comprising:
a housing adapted to dispense a liquid composition comprising a liquid coffee concentrate and water,
an actuatable volumetric mix valve assembly located in the housing and having an actuator capable of moving a valve from a first position to at least a second position, wherein in the first position the valve assembly operatively prevents flow of the liquid composition through an outlet of the valve assembly, the valve assembly having a concentrate inlet and a concentrate reservoir having a set volume and being in fluid communication with the concentrate inlet in the first position and adapted to operatively receive liquid coffee concentrate from a concentrate source, wherein in the second position the valve isolates the concentrate inlet from the concentrate reservoir, the valve assembly further comprising a water inlet adapted to receive water from a hot water receptacle through a hot water conduit connected to the inlet, wherein a seal member of the valve prevents flow of water into the concentrate reservoir in the first position, wherein in the second position the valve allows fluid communication between the water inlet, the concentrate reservoir, and the outlet of the valve assembly, at least a portion of the outlet arranged below the water inlet and the concentrate reservoir whereby the water and liquid coffee concentrate from the concentrate reservoir are adapted to flow via gravity out through the outlet in the second position;
a water receptacle adapted for receiving water from a water source;
a water heater operatively connected to the water receptacle by a conduit;
a second conduit operatively connected between the water heater and the hot water receptacle for providing water heated by the water heater to the hot water receptacle;
a concentrate receptacle adapted to be connected to the concentrate source comprising the liquid coffee concentrate; and
a concentrate conduit operatively connected between the concentrate receptacle and the concentrate inlet of the valve assembly.

2. The device according to claim 1, wherein the valve assembly includes a vent line located above and in fluid communication with the concentrate reservoir in the first position, and wherein the vent conduit is connected to the vent line and is adapted to extend above a level of liquid concentrate in a concentrate container adapted to be connected to the concentrate receptacle.

3. The device according to claim 2, wherein the vent line includes a transparent or translucent sight gauge that allows viewing of a level of concentrate.

4. The device according to claim 2, wherein in the first position the fixed volume concentrate reservoir and valve assembly vent line are in fluid communication, and wherein the hot water receptacle is located above the valve assembly.

5. The device according to claim 1, wherein the concentrate reservoir is operatively connected to a concentration adjustment member that can be actuated to increase or decrease the volume of the concentrate reservoir.

6. The device according to claim 2, wherein the valve assembly includes at least a second concentrate inlet and a second concentrate reservoir having a volume and being in fluid communication with the second concentrate inlet in the first position and adapted to operatively receive liquid concentrate from a second concentrate source, wherein in a third position the valve isolates the second concentrate inlet from the second concentrate reservoir and allows fluid communication between the water inlet, the second concentrate reservoir and the outlet of the valve assembly, at least a portion of the outlet arranged below the water inlet and the second concentrate reservoir whereby the water and the liquid coffee concentrate from the second concentrate reservoir adapted to flow via gravity out of the outlet in the third position.

7. The device according to claim 6, wherein the valve is a rotatable valve having an upper surface and a lower surface with the fixed volume concentrate reservoir and the second fixed volume concentrate reservoir each having an aperture on an upper surface and a lower surface of the valve to allow fluid communication between the respective concentrate inlets in the first position.

8. The device according to claim 1, wherein the valve is a two-stage valve.

9. A device for producing a beverage solution from a liquid concentrate, comprising:
- a receptacle for storing water;
- a volumetric mix valve assembly;
- a conduit connecting the receptacle to the volumetric mix valve assembly;
- a concentrate receptacle adapted to receive a liquid concentrate from a concentrate source;
- a concentrate conduit connecting the concentrate receptacle to the volumetric mix valve assembly for transporting the liquid concentrate, wherein the receptacle for storing water and the concentrate receptacle are located at a height greater than a maximum height of the volumetric mix valve assembly, wherein the volumetric mix valve assembly includes a fixed volume concentrate reservoir that is adapted to be filled with the liquid concentrate when a valve of the valve assembly is in a first position; and
- an activating mechanism operatively connected to the volumetric mix valve assembly, wherein upon activation of the activating mechanism, the valve moves to a second position wherein the fixed volume concentrate reservoir is in fluid communication with an outlet of the volumetric mix valve assembly and isolated from the concentrate conduit, and wherein in the second position, the receptacle for storing water and the conduit connecting the receptacle to the volumetric mix valve assembly are in fluid communication with the valve assembly outlet whereby the liquid concentrate and heated water are adapted to flow via gravity out through the outlet.

10. The device according to claim 9, wherein the device is free of a filter located between the concentrate receptacle and the outlet of the volumetric mix valve assembly, wherein the device is adapted for producing a heated beverage solution and wherein the receptacle is for storing water heated by a water heater of the device operatively connected to the receptacle.

11. The device according to claim 9, wherein the valve is a two-stage valve.

12. The device according to claim 9, wherein in the first position of volumetric mix valve assembly is adapted to receive a portion of water from the receptacle for storing water.

13. The device according to claim 9, wherein the valve assembly includes a vent line located above and in fluid communication with the concentrate reservoir in the first position, and wherein the vent conduit is connected to the vent line and is adapted to extend above a level of liquid concentrate in a concentrate container adapted to be connected to the concentrate receptacle.

14. The device according to claim 13, wherein the vent line includes a transparent or translucent sight gauge that allows viewing of a level of concentrate.

15. The device according to claim 13, wherein in the first position the fixed volume concentrate reservoir and valve assembly vent line are in fluid communication, and wherein the hot water receptacle is located above the valve assembly.

16. The device according to claim 9, wherein the valve assembly includes at least a second concentrate inlet and a second concentrate reservoir having a volume and being in fluid communication with the second concentrate unit in the first position and adapted to opportunely receive liquid concentrate from a second concentrate source, wherein in the third position the valve isolates the second concentrate inlet from the second concentrate reservoir and allows fluid communication between the water inlet, the second concentrate reservoir and the outlet of the valve assembly, at least a portion of the outlet arranged below the water inlet and the second concentrate reservoir whereby the water and the liquid coffee concentrate from the second concentrate reservoir adapted to flow via gravity out of the outlet in the third position.

17. The device according to claim 9, wherein the concentrate reservoir is operatively connected to a concentration adjustment member that can be actuated to increase or decrease the volume of the concentrate reservoir.

18. The device according to claim 9, wherein the valve is a rotatable valve having an upper surface and a lower surface with the fixed volume concentrate reservoir and the second fixed volume concentrate reservoir each having an aperture on an upper surface and a lower surface of the valve to allow fluid communication between the respective concentrate inlets in the first position.

19. The device according to claim 9, wherein the device further includes a water valve operatively connected to the water source and actuatable by the actuator to provide hot water through the outlets.

20. The device according to claim 9, wherein the valve is movable in a linear direction from the first position to at least the second position.

* * * * *